US009919319B2

(12) United States Patent
Moore et al.

(10) Patent No.: US 9,919,319 B2
(45) Date of Patent: Mar. 20, 2018

(54) METHOD FOR IMPROVING RHEOLOGICAL PROPERTIES OF MINERAL SLURRY

(71) Applicant: Kemira Oyj, Helsinki (FI)

(72) Inventors: Lucas R. Moore, Marietta, GA (US); Mika Martikainen, Espoo (FI)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 14/971,164

(22) Filed: Dec. 16, 2015

(65) Prior Publication Data
US 2016/0151791 A1 Jun. 2, 2016

Related U.S. Application Data

(63) Continuation of application No. 13/992,251, filed as application No. PCT/IB2011/003041 on Dec. 14, 2011, now abandoned, which is a continuation of application No. 12/967,515, filed on Dec. 14, 2010, now abandoned.

(51) Int. Cl.
B03D 1/016 (2006.01)
B03D 1/012 (2006.01)
B03D 1/014 (2006.01)
C08K 3/34 (2006.01)
B02C 23/08 (2006.01)
B03D 1/008 (2006.01)

(52) U.S. Cl.
CPC .............. B03D 1/016 (2013.01); B02C 23/08 (2013.01); B03D 1/012 (2013.01); B03D 1/014 (2013.01); C08K 3/34 (2013.01); B03D 1/008 (2013.01); B03D 2201/005 (2013.01); B03D 2203/02 (2013.01); B03D 2203/04 (2013.01)

(58) Field of Classification Search
CPC ........ B03D 1/016; B03D 1/014; B03D 1/012; B03D 2201/005; B03D 2203/04; B02C 23/08
USPC ....................................................... 524/456
See application file for complete search history.

(56) References Cited

U.S. PATENT DOCUMENTS

| 4,741,838 | A | * | 5/1988 | Sharpe, Jr. ............... C02F 1/54 106/487 |
| 5,273,675 | A | * | 12/1993 | Lein ...................... C11D 3/3956 252/186.1 |
| 5,284,712 | A | * | 2/1994 | Kawai ................. C04B 41/0018 264/110 |
| 5,307,938 | A | | 5/1994 | Lillmars |
| 5,533,626 | A | | 7/1996 | Nagaraj et al. |
| 7,115,692 | B2 | | 10/2006 | Mongoin et al. |
| 8,720,694 | B2 | * | 5/2014 | Nagaraj ................. B03D 1/016 209/166 |
| 2002/0028860 | A1 | | 3/2002 | Kerr et al. |
| 2004/0112834 | A1 | * | 6/2004 | Perez ...................... C22B 1/00 210/696 |
| 2005/0187113 | A1 | | 8/2005 | Hayes |
| 2006/0009560 | A1 | | 1/2006 | Gane et al. |
| 2006/0106129 | A1 | * | 5/2006 | Gernon ................... C09D 5/024 523/122 |
| 2008/0146700 | A1 | * | 6/2008 | Kraus ................... C08F 212/14 524/3 |
| 2009/0014695 | A1 | | 1/2009 | Lynch |
| 2010/0120650 | A1 | * | 5/2010 | Pfeiffer ................ C11D 3/3765 510/221 |
| 2010/0239487 | A1 | | 9/2010 | Constantz et al. |

FOREIGN PATENT DOCUMENTS

WO    WO 00/43317    7/2000

OTHER PUBLICATIONS

Supplementary European Search Report for European Patent Application No. 11848430.2, dated Mar. 11, 2015.
Klein, B; Pawlik, M: "Rheology modifiers for mineral suspensions", Minerals and Metallurgical Processing May 2005 Society for Mining, Metallurgy and Explorations, vol. 22, No. 2, May 2005 (May 2005), pp. 83-88.
Espinosa-Gomez, Rodolfo et al.: "Dispersion Study on Slimes from Niobec", CIM Bulletin, Montreal, CA, vol. 80, URL:http://www.advantagemud.com/documents/pds/thinners.dispersants/alcomer74.pdf.
Genc, A.M., Kilickaplan, I., Laskowski, J.S.: "Pulp rheology in the flotation of serpentinised ultramatic nicke sulfide ore and its effect on flotation", 49$^{th}$ Annual Conference of Metallurgists of CIM, vol. 8, Oct. 6, 2010 (Oct. 6, 2010), pp. 13-20.

* cited by examiner

Primary Examiner — Hui H Chin
(74) Attorney, Agent, or Firm — King & Spalding

(57) ABSTRACT

A method for improving the rheological properties of mineral slurry comprising adding a copolymeric dispersing agent to the slurry to disperse silicate minerals. Also disclosed is a method for flotating mineral slurry.

19 Claims, 9 Drawing Sheets

METHOD FOR IMPROVING RHEOLOGICAL PROPERTIES OF MINERAL SLURRY

CROSS REFERENCE TO RELATED APPLICATION

This application is a continuation of U.S. patent application Ser. No. 13/992,251 filed Aug. 9, 2013, which is a 371 of PCT Patent Application No. PCT/IB2011/003041 filed Dec. 14, 2011, which is a continuation of U.S. patent application Ser. No. 12/967,515, filed Dec. 14, 2010. The complete disclosure of each of the above-identified applications is fully incorporated herein by reference.

BACKGROUND OF THE INVENTION

The present invention relates to a method for improving rheological properties of mineral slurry. More particularly the present invention relates to a method wherein a copolymeric dispersing agent is added to the slurry to disperse silicate minerals. The present invention relates to a flotation method Flotation is a process where mineral slurry produced from pulverized ore is mixed with foam forming organic chemicals and with the aid of air foam is formed to mineral slurry. Collector chemicals bound the valuable metal concentrate to the surface of the foam bubbles. Mineral concentrate foam is collected from the surface of the flotation cell.

Froth flotation commences by comminution, which is used to increase the surface area of the ore for subsequent processing and break the rocks into the desired mineral and gangue in a process known as liberation, which then has to be separated from the desired mineral. The ore is ground into a fine powder and mixed with water to form a slurry. The desired mineral is rendered hydrophobic by the addition of a surfactant or collector chemical. The particular chemical depends on which mineral is being refined. This slurry (more properly called the pulp) of hydrophobic mineral-bearing ore and hydrophilic gangue is then introduced to a water bath which is aerated, creating bubbles. The hydrophobic grains of mineral-bearing ore escape the water by attaching to the air bubbles, which rise to the surface, forming a foam or a scum (more properly called a froth). The froth is removed and the concentrated mineral is further refined (Wikipedia).

Serpentinite is a rock composed of one or more serpentine group minerals. Separation of nickel minerals from serpentinite-containing gangue is challenging. Because of lack of good separation from gangue the plants are forced to operate flotation process based on quality of the concentrate with the cost of nickel recovery losses. This significantly decreases the yield and the economy of the operations. Problem with the serpentine is that it contains Mg which is problematic element in nickel smelters. End customers (smelters) have strict limits for Mg and excess Mg decreases the value of the concentrate, in some cases practically to level of non-value product.

Serpentine content can be as high as 30% of incoming flow calculated as MgO. At normal slurry densities the serpentinite forms a non-newtonian viscous jelly that prevents dispersion of air and the passage of air bubbles to the surface of a flotation cell. This problem is generally solved by decreasing the solid content in flotation i.e. increasing water consumption. In worst cases only 10% solid content is used with highly serpentine containing ores. Normal operation is in the range of 30-40% solid content.

BRIEF DESCRIPTION OF THE INVENTION

In the present invention it was discovered that by adding a low molecular weight dispersant the flotation process may be improved several ways. For example the process time is be decreased, the throughput is increased and the selectivity of valuable metal/mineral is increased.

The present invention provides a method for improving rheological properties of mineral slurry comprising adding a copolymeric dispersing agent to the slurry to disperse silicate minerals.

The present invention also provides use of a copolymeric dispersing agent for improving rheological properties of mineral slurry by adding the copolymeric dispersing agent to the slurry to disperse silicate minerals.

The present invention also provides a method for flotating mineral slurry, comprising improving the rheological properties of the slurry by adding the copolymeric dispersing agent to the slurry to disperse silicate minerals.

The method of the invention may be utilized in the recovery of value minerals from ores, such as sulfide ores.

It is an advantage of the present invention that by adding the low molecular weight dispersant to the mineral slurry, the viscosity of the slurry is decreased, thus increasing the flotation performance.

DETAILED DESCRIPTION OF THE INVENTION

Figure 1:
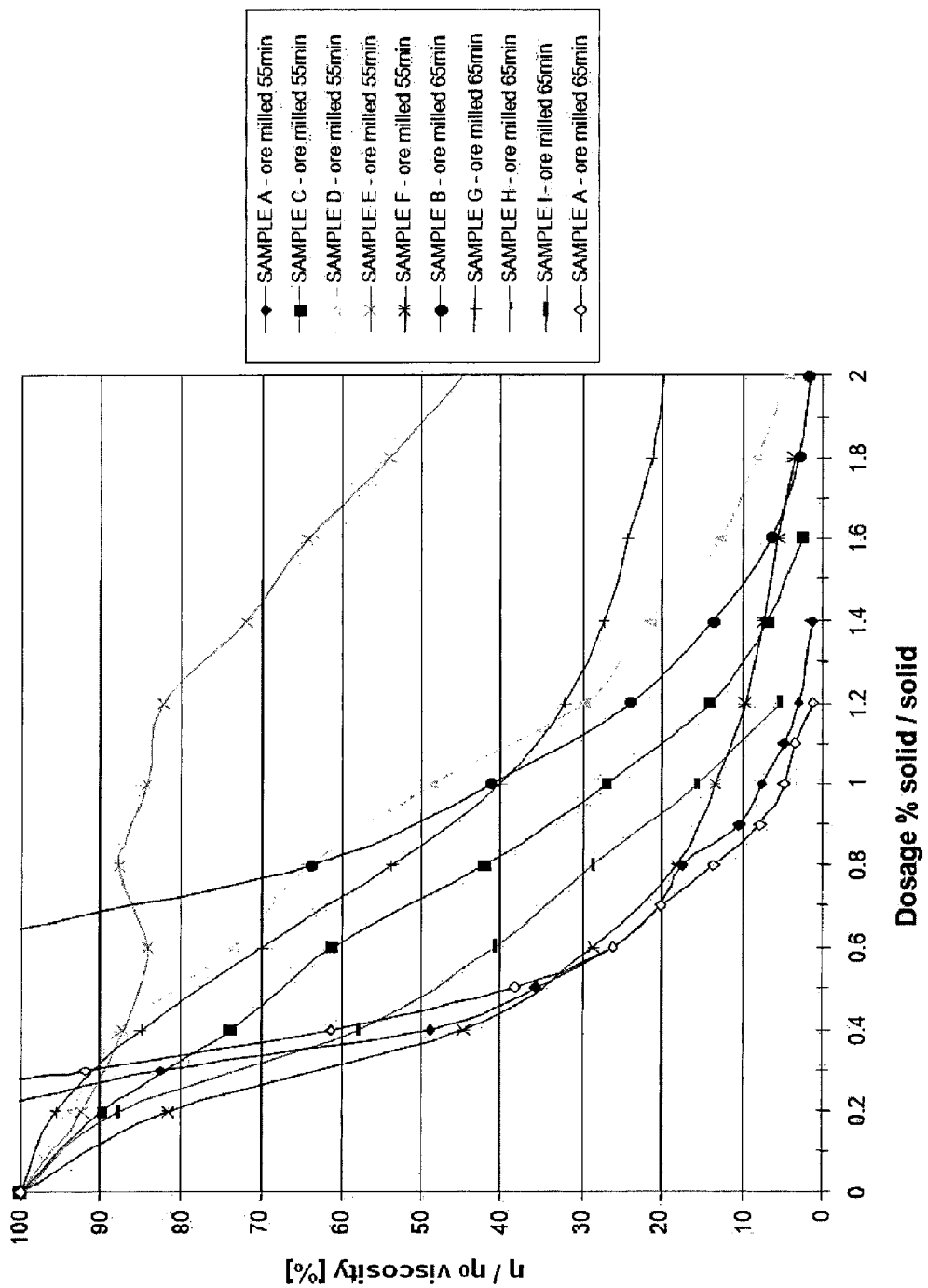
FIG. 1 shows the $\eta/\eta_0$ viscosity [%] (Brookfield 50 RPM, 60% solid slurry).
Figure 2:
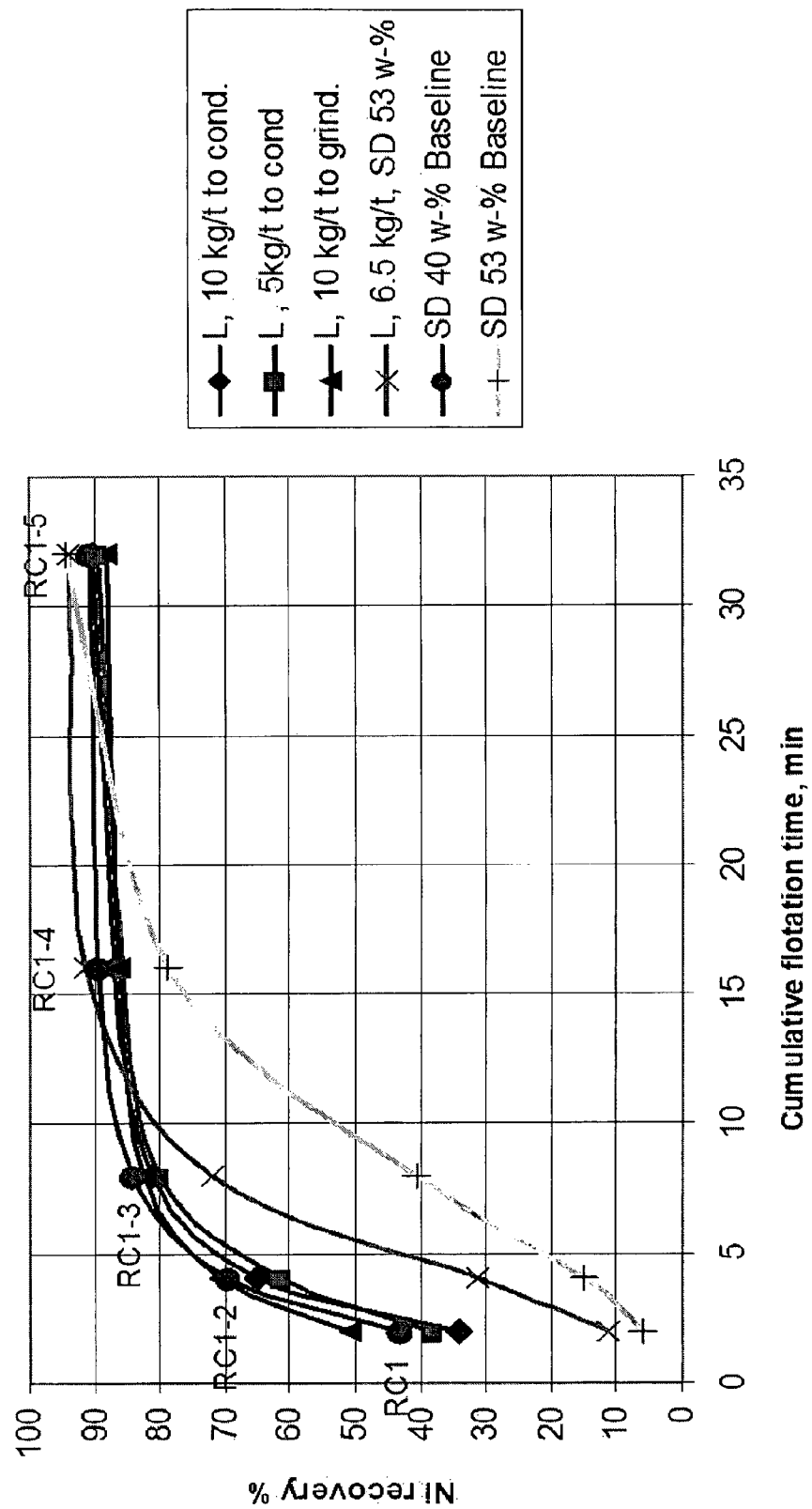
FIG. 2 shows cumulative nickel recovery in relation to cumulative flotation time in the flotation tests with Hitura serpentinite sample using dispersive reagent L. The baseline tests were done without dispersive reagents.
Figure 3:
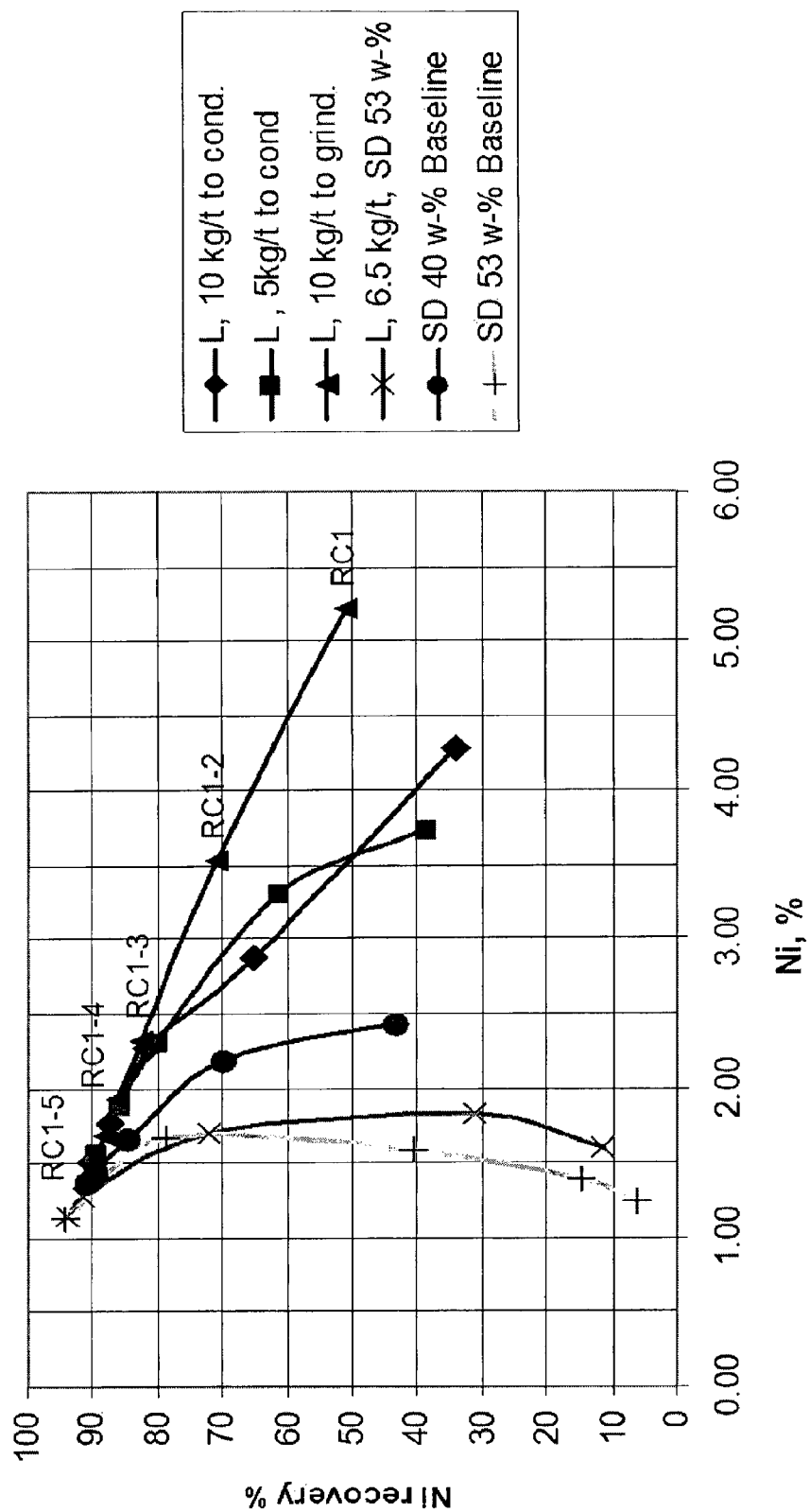
FIG. 3 shows cumulative nickel grade-recovery results in the flotation tests with Hitura serpentinite sample using dispersive reagent L. The baseline tests were done without dispersive reagents.
Figure 4:
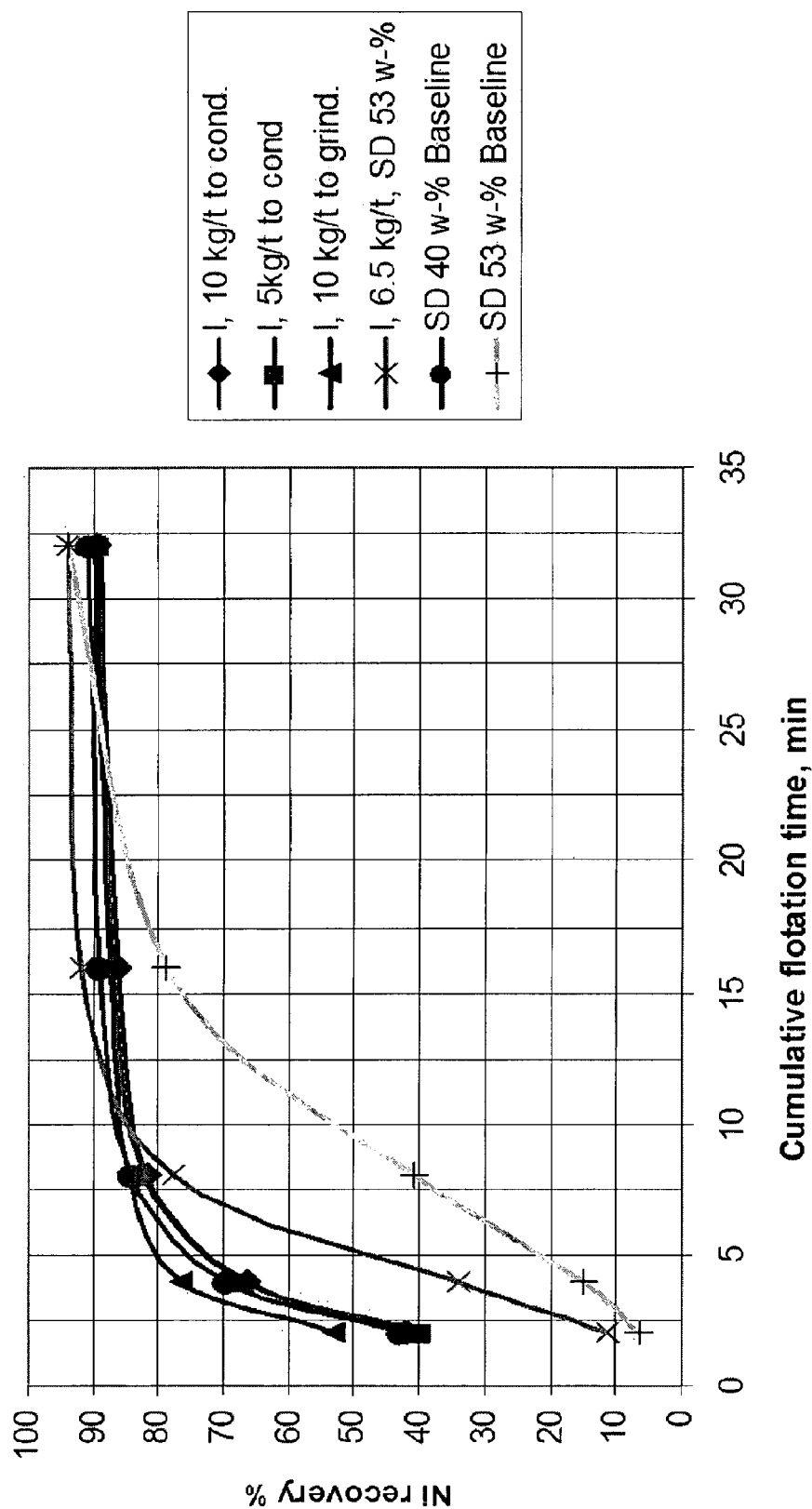
FIG. 4 shows cumulative nickel recovery in relation to cumulative flotation time in the flotation tests with Hitura serpentinite sample using dispersive reagent I.
Figure 5:
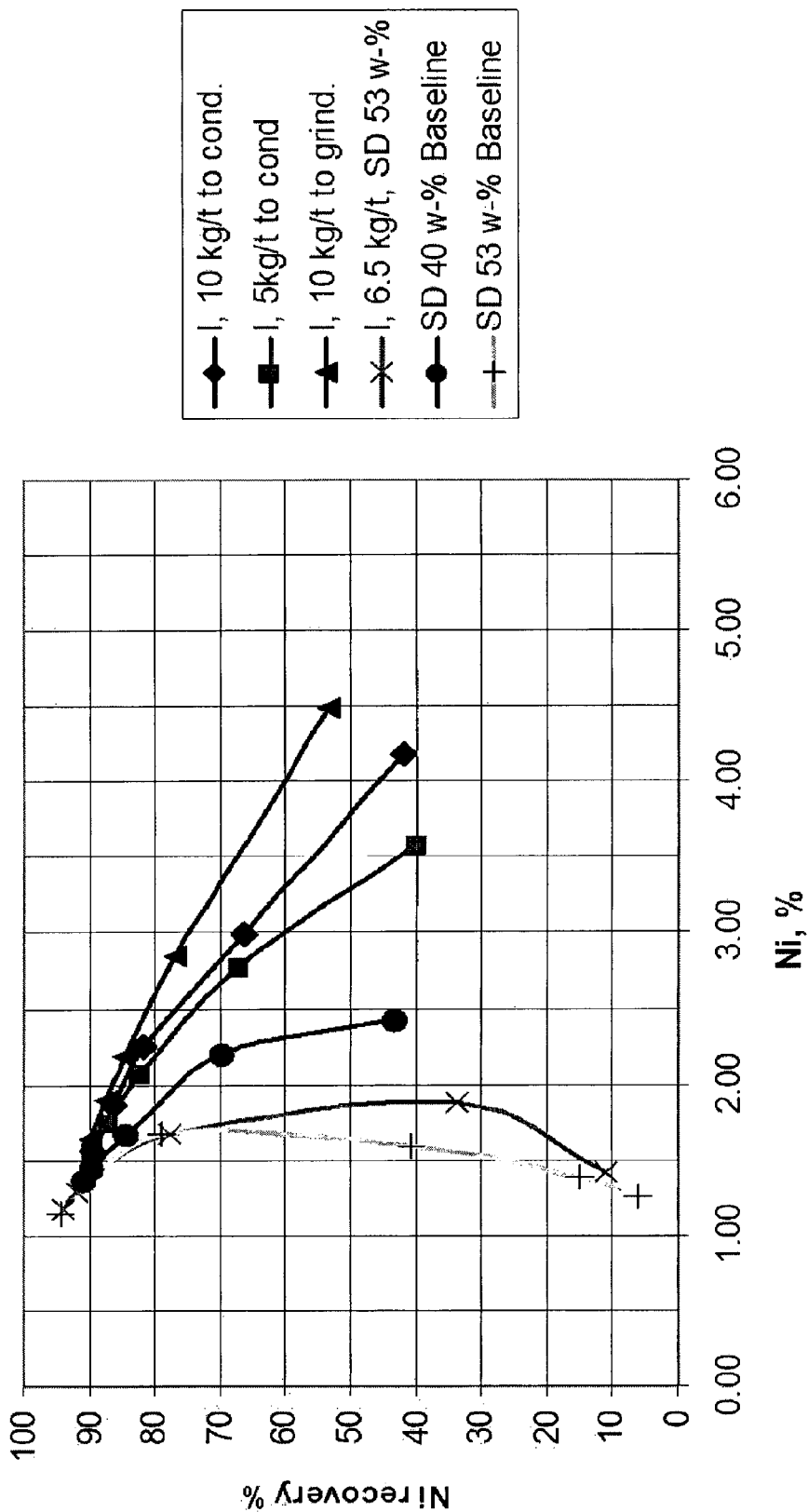
FIG. 5 shows cumulative nickel grade-recovery results in the flotation tests with Hitura serpentinite sample using dispersive reagent I.
Figure 6:
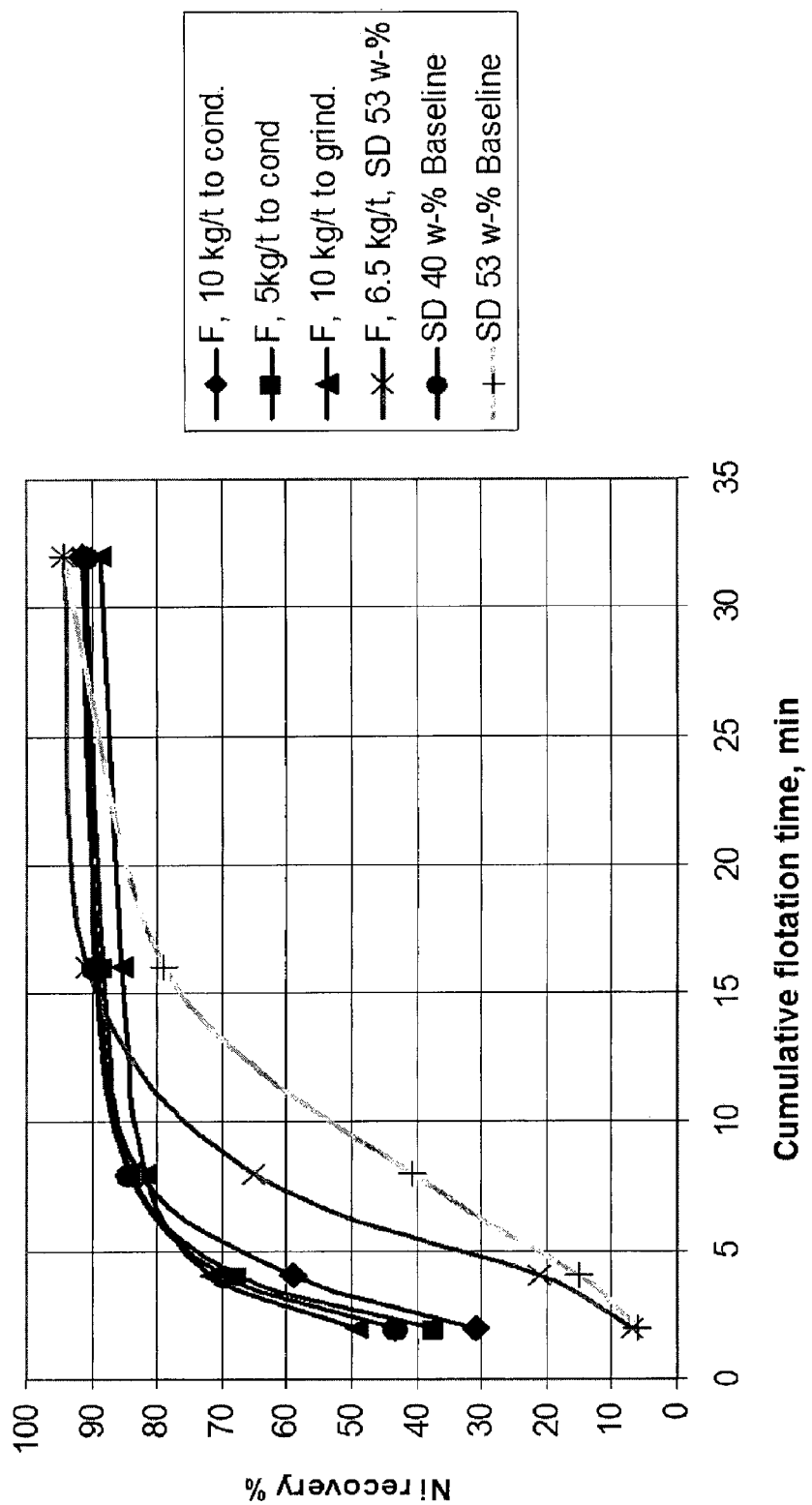
FIG. 6 shows cumulative nickel recovery in relation to cumulative flotation time in the flotation tests with Hitura serpentinite sample using dispersive reagent F.
Figure 7:
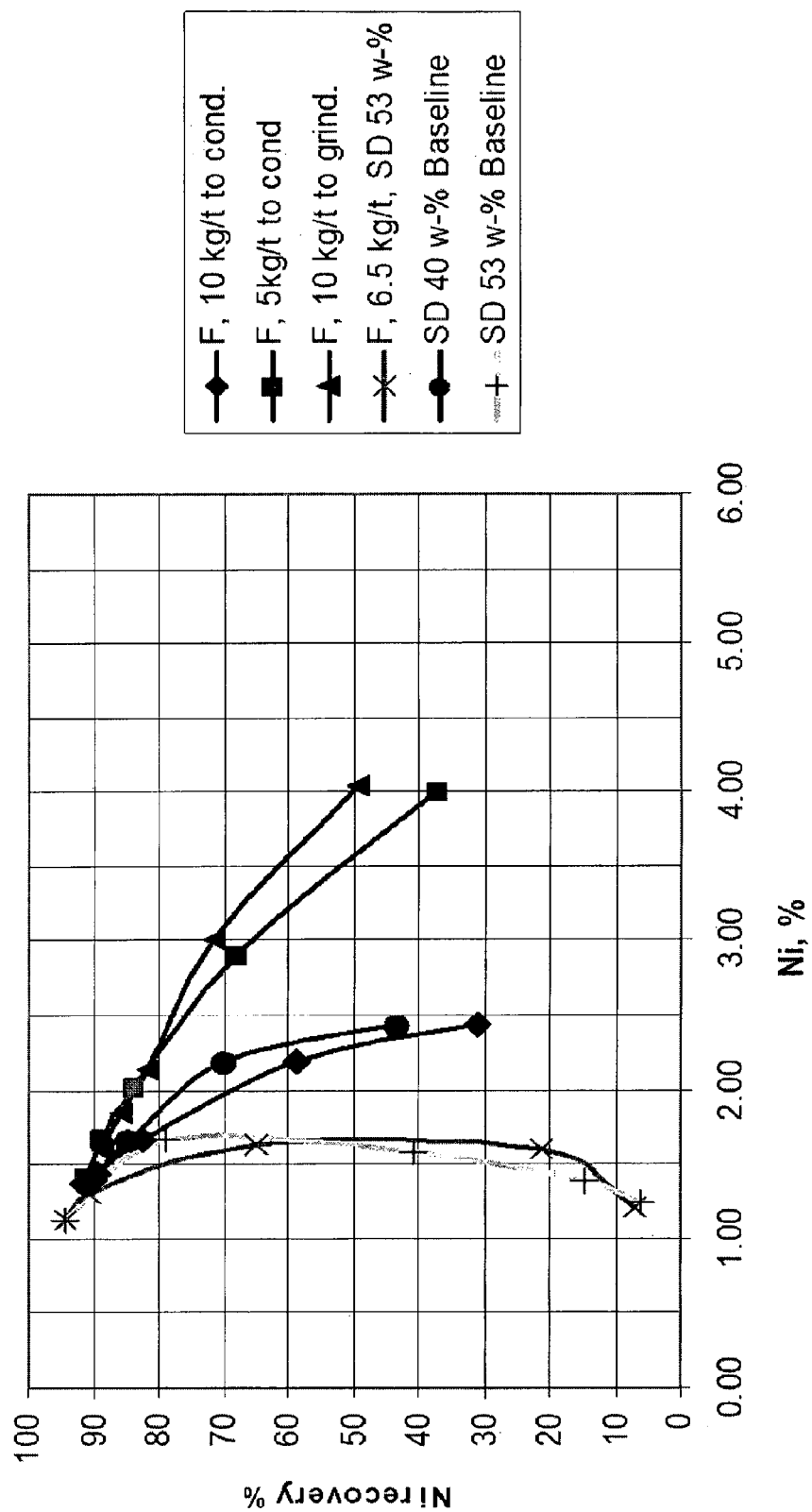
FIG. 7 shows cumulative nickel grade-recovery results in the flotation tests with Hitura serpentinite sample using dispersive reagent F.
Figure 8:
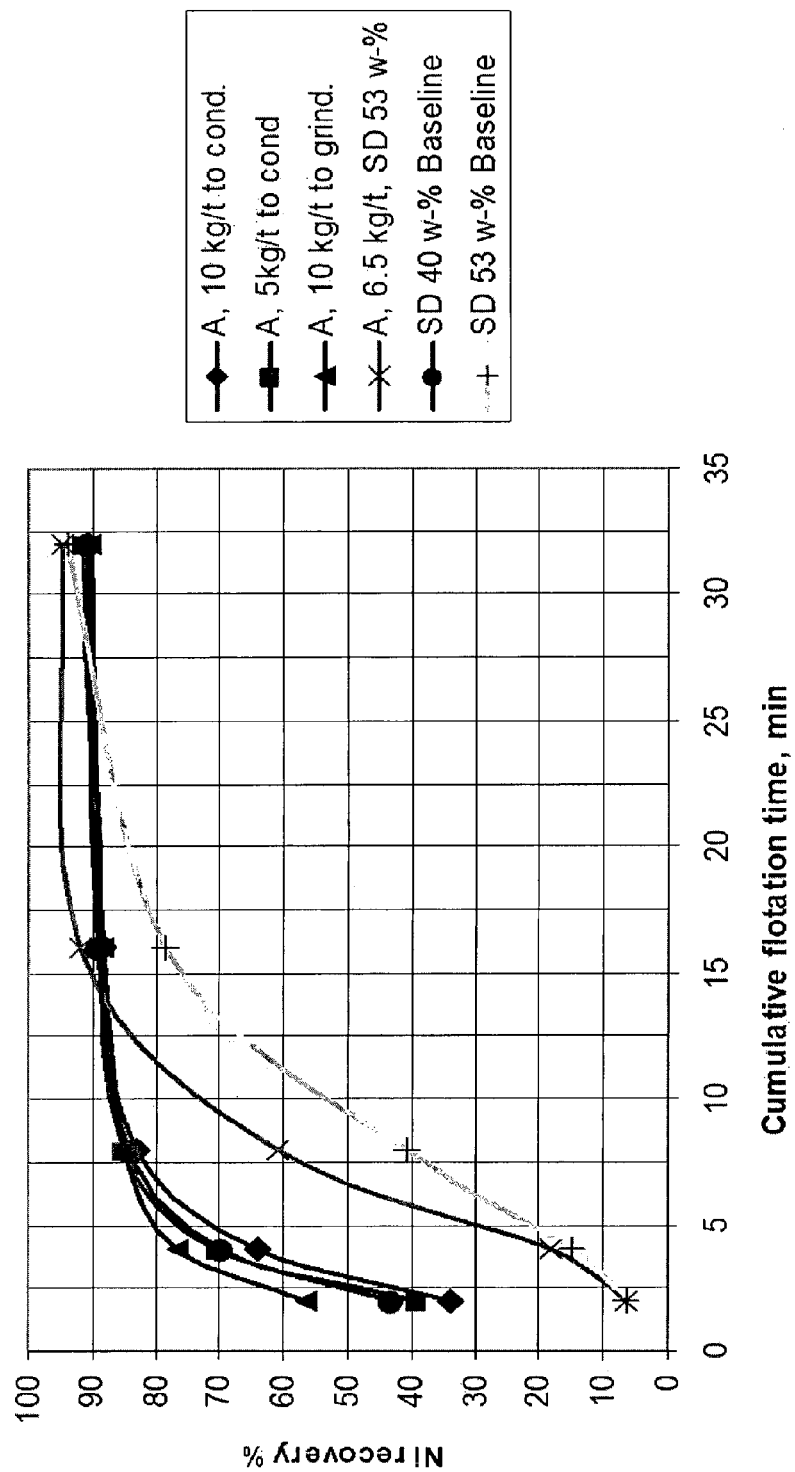
FIG. 8 shows cumulative nickel recovery in relation to cumulative flotation time in the flotation tests with Hitura serpentinite sample using dispersive reagent A.
Figure 9:
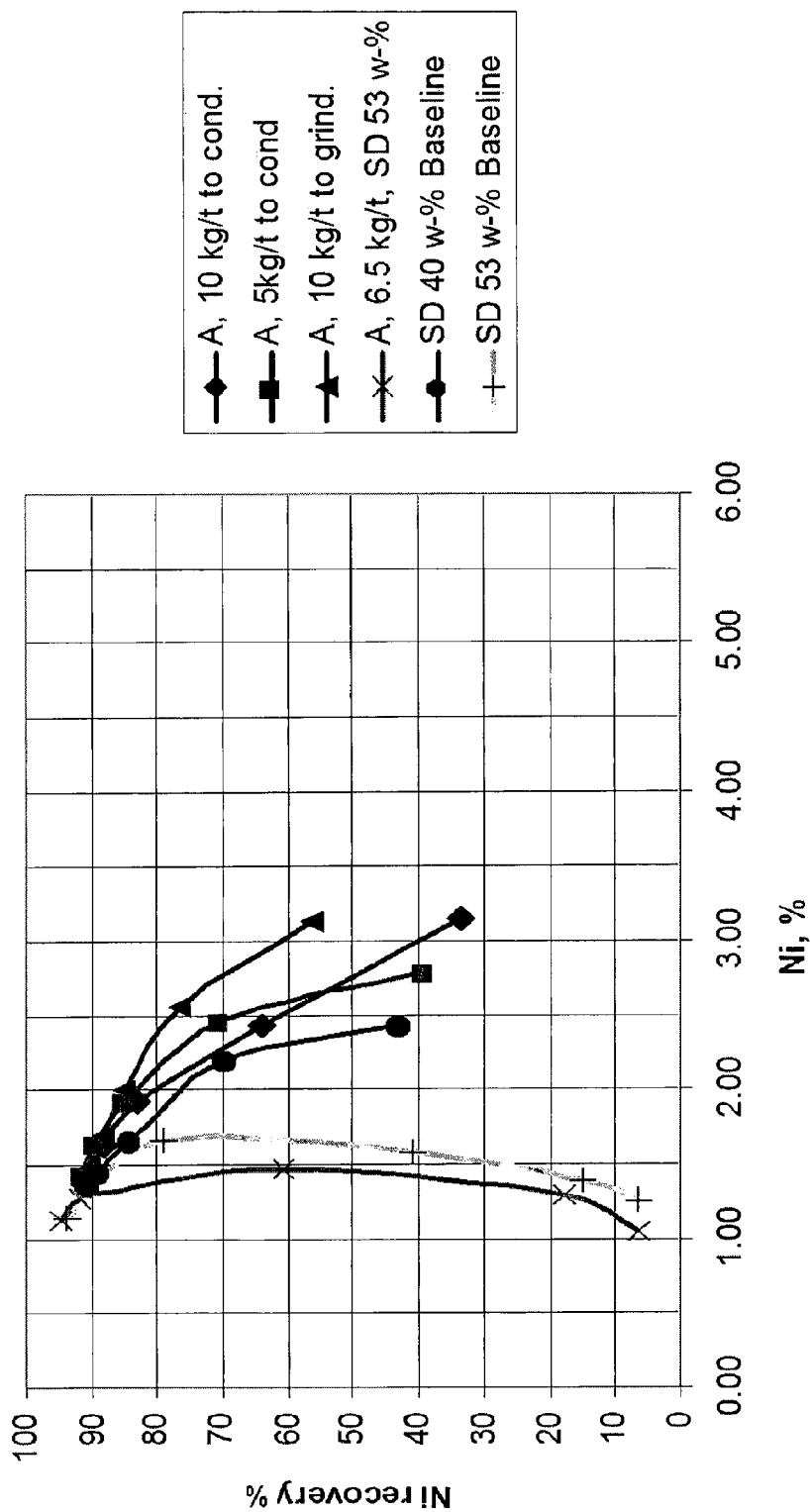
FIG. 9 shows cumulative nickel grade-recovery results in the flotation tests with Hitura serpentinite sample using dispersive reagent A.

The present invention provides a method for improving rheological properties of mineral slurry comprising adding a copolymeric dispersing agent to the slurry to disperse silicate minerals. The copolymer refers to a polymer derived from two (or more) monomeric species. The copolymer has generally a low molecular weight, such as about 20000 Daltons or less.

Generally the serpentine and other similar minerals prevent the usage of normal slurry concentrations due to increasing viscosity. Since the concentration of the slurry (solid content) can be increased without scarifying the flotation performance, when dispersants are used, the overall production rate increases.

The silicate minerals, as used herein, include, but are not limited to, talc; pyrophyllite; pyroxene group of minerals, such as diopside, augite, homeblendes, enstatite, hypersthene, ferrosilite, bronzite; amphibole group of minerals, such as tremolite, actinolite, anthophyllite; biotite group of minerals, such as phlogopite, biotite; chlorite group of minerals; serpentine group of minerals, such as serpentine, chrysotile, palygorskite, lizardite, anitgorite; olivine group of minerals, such as olivine, forsterine, hortonolite, fayalite.

In one embodiment the silicate mineral is magnesium silicate, such as serpentine. The serpentine group describes a group of common rock-forming hydrous magnesium iron phyllosilicate ((Mg, Fe)$_3$Si$_2$O$_5$(OH)$_4$) minerals; they may contain minor amounts of other elements including chromium, manganese, cobalt and nickel. In mineralogy and gemology, serpentine may refer to any of 20 varieties belonging to the serpentine group. Owing to admixture, these varieties are not always easy to individualize, and distinctions are not usually made. There are three important mineral polymorphs of serpentine: antigorite, chrysotile and lizardite (Wikipedia).

Rheology is the study of the flow of matter: primarily in the liquid state, but also as 'soft solids' or solids under conditions in which they respond with plastic flow rather than deforming elastically in response to an applied force. It applies to substances which have a complex molecular structure, such as muds, sludges, suspensions, polymers and other glass formers (e.g. silicates), as well as many foods and additives, bodily fluids (e.g. blood) and other biological materials. The flow of these substances cannot be characterized by a single value of viscosity (at a fixed temperature). While the viscosity of liquids normally varies with temperature, it is variations with other factors which are studied in rheology (Wikipedia).

The rheological properties of a liquid are dominant features that can be quantified to characterize its behavior, and the response of a liquid to a forced shearing flow is the basis for determining the specific rheological properties of a given liquid. Examples of general qualitative terms used to describe these properties are viscoelastic, Newtonian, non-Newtonian, thixotropic and dilatant. Examples of quantitative parameters used are viscosity, elasticity, shear rate, shear strain, and shear stress. The "rheological properties" as used herein therefore refer to various properties, the viscosity being only one of them.

In one embodiment the rheological properties comprise the viscosity of the slurry. By adding the copolymeric dispersant the viscosity will be decreased i.e. improving the rheological properties comprise improving (decreasing) the viscosity of the slurry. Therefore one exemplary embodiment provides a method for decreasing the viscosity of mineral slurry.

The method may be utilized in separation of value minerals from ore, for example by using flotation or any other suitable method. The value mineral of interest may be for example nickel, copper, zinc, silver, gold etc. One embodiment provides a method for floating mineral slurry, comprising improving the rheological properties of the slurry with the method disclosed herein, i.e. by adding the copolymeric dispersing agent to the slurry to disperse the silicate minerals.

The dispersing agent, or dispersant, as used herein refers to an agent which keeps the undesirable material in suspension i.e. it is not allowed to flocculate. In the present invention the silicate minerals, e.g. magnesium salts, are maintained as homogenously suspended so that the mineral of interest can adhere to the surface of the air bubbles in the flotation.

In one embodiment the copolymeric dispersing agent is a copolymer of acrylic acid (AA) and 2-acrylamido-2-methyl propane sulfonic acid (AMPS). The average molecular weight of the copolymer of acrylic acid and 2-acrylamido-2-methyl propane sulfonic acid may be, but is not limited to, in the range of about 9000-20000 Daltons. It may be in 45-60% solution of polymer in water, pH 3-7, clear to yellow viscous liquid. The ratio of acrylic acid to 2-acrylamido-2-methyl propane sulfonic acid in the copolymer may be in the range of 70:30 to 50:50 (w/w). In one embodiment the ratio of acrylic acid to 2-acrylamido-2-methyl propane sulfonic acid in the copolymer is about 60:40 (w/w). In one embodiment the copolymer of acrylic acid and 2-acrylamido-2-methyl propane sulfonic acid has a molecular weight of about 15000-20000 Daltons.

In one embodiment the copolymeric dispersing agent is a copolymer of acrylic acid (AA) and hydroxyethyl methacrylate (HEMA). The average molecular weight of the copolymer of acrylic acid and hydroxyethyl methacrylate may be, but is not limited to, about 12000 Daltons. The ratio of acrylic acid to hydroxyethyl methacrylate in the copolymer may be in the range of 80:20 to 60:40 (w/w). In one embodiment the ratio of acrylic acid to hydroxyethyl methacrylate in the copolymer is about 70:30 (w/w).

In one embodiment the copolymer of acrylic acid and hydroxyethyl methacrylate has a molecular weight of about 6000-14000 Daltons. It may be in 45-60% solution of polymer in water, pH 3-7, clear to yellow viscous liquid.

In one embodiment the copolymeric dispersing agent is a copolymer of acrylic acid and methacrylic acid. In one embodiment the copolymer of acrylic acid and methacrylic acid has a molecular weight of about 5500 Daltons, and pH of about 7. In one embodiment the copolymer of acrylic acid and methacrylic acid has a molecular weight of about 4000-7000 Daltons, for example 5000-6000 Daltons.

In one embodiment the copolymeric dispersing agent is a copolymer of ethylene glycol methacrylate phosphate and hydroxyethyl methacrylate. In one embodiment the copolymer of ethylene glycol methacrylate phosphate (EGMAP) and hydroxyethyl methacrylate has a molecular weight of about 8000-12000 Daltons. In one embodiment the copolymer of ethylene glycol methacrylate phosphate and hydroxyethyl methacrylate has a molecular weight of about 10000 Daltons.

Any suitable combinations of the dispersing agents may also be used in the method of the present invention.

Also other suitable monomers may be included to the copolymers. These may include, but are not limited to, vinyl sulfonic acid or vinyl sulfonate salts; vinyl phosphoric acid or vinyl phosphonate salts; vinylidene diphosphonic acid or salts thereof; methacrylic acid; vinyl acetate; vinyl alcohol; vinyl chloride; unsaturated mono- or dicarboxylic acids or anhydrides, such as maleic anhydride, maleic acid, fumaric acid, itaconic acid, aconitic acid, mesaconic acid, citraconic acid, crotonic acid isocrotonic acid, angelic acid, tiglic acid; vinyl chloride; styrene-p-sulfonic acid, or styrene sulfonates salts; allyl sulfonate salts; acrylamido-2-methyl propane sulfonic acid (AMPS); hydroxyphosphono acetic acid (HPA); hypophosphorus acids such as $H_3PO_3$, giving units of formula —PO(OH)—; acrylamides, propargyl alcohol having formula $HC\equiv C-CH_2-OH$; butyr-1,4-diol, hydroxyethyl methacrylate (HE-MA), hydroxyethyl acrylate (HEA) and mixtures thereof.

The synthesis of the copolymeric dispersing agents may be carried out by any suitable polymerization reaction which is well-known in the art.

Said polymerization reaction may be initiated by any suitable means which results in generation of a suitable free-radical. In the radical polymerization technique the source of free radicals may be any suitable method of generating free radicals such as thermally induced method, redox initiating method, photochemical initiating method or high energy radiation such as electron beam, X or gamma ray radiation. The preferred method of generating free radicals is thermally induced method.

In the radical polymerization typical thermal initiators are azo compounds, peroxides or peroxyesters. The polymerization initiators are not limited to any particular species but may be any of the conventional initiators, inclusive redox initiators, azo initiators and peroxides. Among them, the azo initiators are preferred and, as specific examples thereof, there may be mentioned, among others, azonitrile compounds such as 2,2'-azobis(2-methylpropionitrile) (AIBN), azobisdimethylvaleronitrile and azobisdimethylmethoxy-valeronitrile; azoamidine compounds such as 2,2'-azobis(methylpropionamidine)dihydrochloride (V-50), VA-041, VA-044 and VA-061 (V-50, VA-041, VA-044 and VA-061 are products of Wako Pure Chemical Industries, Ltd.); azoamide compounds such as VA-080, VA-086 and VA-088 (products of Wako Pure Chemical Industries, Ltd.); azoalkyl compounds such as azodi-tert-octane and azoditert-butane; cyanopropylazo-formamide, 4,4'-azobis(cyanovaleric acid), 4,4'-azobis-(cyanopentanoic acid) dimethylazobismethyl propionate, azobishydroxymethyl-propionitrile and the like. Preferred initiators are 2,2'-azobis-(methylpropionamidine) dihydrochlohde (V-50), and 4,4'-azobis(cyanopentanoic acid) or 4,4'-azobis(cyanovaleric acid).

One of these radical polymerization initiators may be used alone, or two or more thereof may be used as a mixture.

The molar ratio of the radical polymerization initiator to the monomer is preferably from 0.0001 to 0.1, more preferably from 0.0005 to 0.05, still more preferably from 0.0005 to 0.01.

Examples

The test program consisted of viscosity measurements and flotation tests. Hitura serpentinite sample (Ni 0.73%) was the main test material of the study. Totally nine dispersive reagents were selected for the rheological studies and flotation tests were done using four the most effective reagents (A, F, I and L).

Viscosity measurements were done with Brookfield viscometer RVDV-I. Temperature was recorded, but not controlled. Temperature varied between 21-23° C. Viscosity was measured with two spindle speed (50 rpm and 100 rpm) according to internal laboratory method used for mineral pastes i.e. coating pastes having solid content up to 60-65 w-%. Slurry volume in measurements was constant 250 ml. Slurry preparation was done with DIAF 20VH mixer.

Milled ore and ion-exchanged water was mixed for 10 min before addition of dispersant. After the dosage slurry was mixed for 5 min before viscosity measurement.

The dispersants tested were the following:
A—AA/AMPS
B—SASMAC
C—AA/MA
D—AA
E—Phosphonate/AA
F—AA/AMPS
G—SASMAC/HEDP
H—EGMAP/HEMA
I—EGMAP/HEMA
J—EGMAP/HEMA
K—EGMAP/HEMA
L—AA/HEMA
Where:
AA=acrylic acid
AMPS=acrylamido-2-methyl propane sulfonic acid
EGMAP=ethylene glycol methacrylate phosphate
HEDP=hydroxyethane-1,1-diphosphonic acid
HEMA=hydroxyethyl methacrylate
MA=methacrylic acid
SASMAC=sodium allyl sulfonate/maleic acid The dispersing agents were tested with dosages of 0.2-2%. The dosage was calculated as solid/solid bases. The solid content of the slurries was 60%. There was no pH control in these experiments.

$\eta/\eta_0$ is the percentage change in viscosity, where $\eta$ is the viscosity at given time and $\eta_0$ is the initial slurry viscosity before dispersant dosage. FIG. 1 shows the $\eta/\eta_0$ viscosity [%]. Sample H is not included to the figure since its dosage actually caused ever increasing viscosities.

The best dispersants based on 0.5% dosage were: A) a copolymer of acrylic acid and 2-acrylamido-2-methyl propane sulfonic acid (mw of about 9000-20000 Daltons), C) a copolymer of acrylic acid and methacrylic acid (mw of about 5500 Daltons), F) a copolymer of acrylic acid and acrylamido-2-methyl propane sulfonic acid, I) a copolymer of ethylene glycol methacrylate phosphate and hydroxyethyl methacrylate (mw of about 10000 Daltons), and L) a copolymer of acrylic acid and hydroxyethyl methacrylate (mw of about 6000-14000 Daltons).

Preparation of the Ore Samples

About 50 kg sample of Hitura serpentinite was received as approximately 100 mm lumps. The whole sample was first crushed to −5 mm grain size. −5 mm material was then halved into two samples. One halve (about 25 kg) was crushed further to the −1 mm grain size using sequential screening and crushing procedure. The sequence consisted of screening of the material using 1 mm sieve and crushing of the +1 mm fraction. The sequence was repeated until the entire sample was in −1 mm grain size. The −1 mm material was homogenized and divided into 1 kg batches for the test work. Both the −5 mm and −1 mm materials were stored into the freezer to avoid oxidation of the sulfide minerals.

TABLE 1

Grain size distribution of the −1 mm test feed materials.
Hitura serpentinite −1 mm

| Sieve μm | Passing % |
|---|---|
| 1180 | 100 |
| 850 | 82.7 |
| 600 | 67.5 |
| 425 | 56.0 |
| 300 | 47.2 |
| 212 | 39.1 |
| 150 | 32.0 |
| 106 | 25.9 |

TABLE 1-continued

Grain size distribution of the −1 mm test feed materials.
Hitura serpentinite −1 mm

| Sieve μm | Passing % |
|---|---|
| 75 | 21.8 |
| 53 | 17.3 |
| 38 | 13.9 |
| 20 | 6.6 |

Chemical and Mineralogical Composition of the Test Feed Samples

The metal contents of the test feed materials were analyzed by ICP method after total dissolution. The serpentinite sample chemical analyses were done also after bromine methanol dissolution. The selective dissolution with bromine methanol allowed calculation of the mineral contests for Hitura serpentinite sample. Sulfur content of the samples was determined by ELTRA method. Furthermore magnetite content was determined by Satmagan method and $SiO_2$ content of the samples was analyzed by colorimetric method. The chemical compositions of the test materials are presented in Table 2. Mineral composition of the serpentinite sample is presented in Table 3.

TABLE 2

Chemical composition of the tests feed materials.

| ICP Co TOTAL % | ICP Co BM % | ICP Cu TOTAL % | ICP Cu BM % | ICP Fe TOTAL % | ICP Fe BM % | ICP Mg TOTAL % | ICP Mg BM % | ICP Ni TOTAL % | ICP Ni BM % | S ELTRA % | Satmagan % | $SiO_2$ Chemical % |
|---|---|---|---|---|---|---|---|---|---|---|---|---|
| 0.027 | 0.027 | 0.26 | 0.254 | 11.3 | 3.44 | 19.6 | 0.452 | 0.73 | 0.701 | 2.38 | 6.95 | 32.8 |

TABLE 3

Mineral composition of the Hitura serpentinite sample.

| Mineral composition, % | |
|---|---|
| Pyrrhotite | 4.02 |
| Pentlandite | 2.27 |
| Chalcopyrite | 0.75 |
| Lizardite | 83.3 |
| Magnetite | 6.95 |
| Chlorite | 3.45 |
| Total | 100 |
| Sulfide fraction, % | |
| Pyrrhotite | 57.12 |
| Pentlandite | 32.22 |
| Chalcopyrite | 10.66 |
| Total | 100 |

Flotation Tests
Experimental Work

Flotation tests were carried out with flotation machine using 2 liter cell volume. Flotation air flow rate was 2 l/min. The tests consisted of five rougher flotation steps. The flotation times for the steps were 2, 2, 4, 8 and 16 min. Cumulative flotation time was 32 min. Table 4 summarizes the values of different parameters in flotation tests.

TABLE 4

Summary of the flotation conditions. Slurry density was the main variable besides dispersing reagent type and dosage.

| Parameter | Value Hitura serp. | Comments |
|---|---|---|
| pH | 6 | pH was readjusted to 6 at the beginning of each flotation step. |
| $H_2SO_4$ | 10.9 kg/t (average) | $H_2SO_4$ consumption varied between 6.6 and 14.4 kg/t depending on the slurry density. $H_2SO_4$-consumption was the highest in the baseline tests. |
| Potassium ethyl xanthate (Cheminova) | 500 g/t (totally) | Distribution: grind 150 g/t, RF1 150 g/t, RF3 100 g/t, RF4 50 g/t and RF5 50 g/t |
| Dowfroth 250 (frother) | 35-60 g/t | |
| Water quality | Tap water | |
| Slurry density | 40 and 55 w-% | |
| Tested dispersing reagents | A, F, I and L | |

TABLE 4-continued

Summary of the flotation conditions. Slurry density was the main variable besides dispersing reagent type and dosage.

| Parameter | Value Hitura serp. | Comments |
|---|---|---|
| Dispersing reagents dosage | 5-10 kg/t | Dispersing reagent was added either to the mill or to the conditioning of the 1$^{st}$ rougher flotation. |

Flotation Test Results
Background

The high viscosity of the slurry is typical feature for the serpentinite based Ni-ores. Fine grinding, which is in some cases required for the satisfactory mineral liberation of the ore, increase the viscosity of the slurry. Slurry solids percent is another main factor affecting on the rheology of the serpentinite based Ni-ore slurries. Viscosity of the slurry increases with increasing solids percent. Because of the high viscosity, serpentinite-based Ni-ores are often processed in low slurry density. In some cases the flotation is done as low as 10 w-% slurry density.

The main aim of the flotation tests presented in this report was to find out the effect of the used dispersing reagents on the flotation results at elevated solids content of the slurry. Furthermore the effect of dispersing reagents on the flotation kinetics of Ni-sulfides was observed.

Results from the Tests with Serpentinite Sample

Results from the flotation tests carried out with the serpentinite sample are presented in FIGS. 2-9. The figures present cumulative nickel recovery in relation to cumulative flotation time and cumulative nickel grade-recovery results for each dispersive reagent. Table 5 presents the approximated flotation time for 90% nickel recovery in the tests with different dispersive reagents and approximated mass recovery for that time. The approximated values are from the tests in which the dispersive reagents were added into the grinding mill.

As can be seen from the cumulative Ni-recovery versus cumulative flotation time graphs (FIGS. 2, 4, 6 and 8), at 40 w-% slurry density the Ni-recovery results with different dispersive reagents did not deviate significantly from the corresponding baseline test results. This indicates that dispersive reagents did not improve flotation kinetics of the Ni-sulfides at 40 w-% slurry density, when compared to the baseline. The same figures show that at 53 w-% slurry density the dispersive reagents increased flotation kinetics of nickel sulfides in comparison to the corresponding baseline test. The flotation times required for the 90% Ni-recovery with different dispersive reagents are presented and compared to the baseline test at Table 5. Table 5 shows that the shortest flotation time for 90% Ni-recovery (13 min vs. 27 min in the baseline test) and also the lowest mass recovery during that flotation time (48% vs. 53% in the baseline test) was achieved with the reagent I.

FIGS. 3, 5, 7 and 9 shows that, when compared to the baseline test, higher Ni-grades of the 1st concentrate (RC1) were achieved in the tests at 40 w-% slurry density especially with dispersive reagents L and I. At 53 w-% slurry density Ni-grade of the concentrates were quite the same as in the baseline test at corresponding slurry density.

The results indicate that the tested dispersive reagents lowered the viscosity of the slurry most effectively at the beginning of the flotation. At 40 w-% slurry density the effect of decreased slurry viscosity was seen as higher concentrate grades especially at the beginning of the flotation (RC1). The baseline viscosity of the slurry was probably much higher at the 53% slurry density than at 40% slurry density, which resulted in slow Ni-sulfides flotation at 53 w-% slurry density. At 53 w-% slurry density, dispersive effect of the tested reagents was seen as faster flotation of Ni-sulfides when compared to the baseline test in the corresponding slurry density. Furthermore the test results indicated that the dispersive effect of the tested reagents was the most significant, when added into the grinding mill.

TABLE 5

Approximated flotation time needed for 90% Ni-recovery in the baseline tests and in the tests with different dispersive reagents. The approximated mass recovery during the approximated flotation time is also presented. The approximated values are from the tests in which the dispersive reagents were added into the grinding mill.

| Test ID | | Approx. flotation time (min) for 90% Ni-recovery | | Approx. mass rec-% during the 90% Ni-recovery flotation time | |
|---|---|---|---|---|---|
| | (KEMHIT-tests) | SD 40 w-% | SD 53 w-% | SD 40 w-% | SD 53 w-% |
| Baseline | REF02, REF04 | 20 | 27 | 44 | 53 |
| Dispergant L | DIS_L16, DIS_L13 | ≥32 | 14.5 | 38 | 50 |
| Dispergant I | DIS_I17, DIS_I14 | ~32 | 13 | 39 | 48 |
| Dispergant F | DIS_F10, DIS_F12 | >32 | 16 | 39 | 50 |
| Dispergant A | DIS_A18, DIS_A15 | ~32 | 15 | 44 | 51 |

The invention claimed is:

1. A method for improving rheological properties of mineral slurry comprising adding a copolymeric dispersing agent to the slurry to disperse silicate minerals; wherein the mineral slurry comprises nickel sulfides and silicate minerals and wherein the copolymeric dispersing agent is selected from the group consisting of: a copolymer of acrylic acid and 2-acrylamido-2-methyl propane sulfonic acid; a copolymer of acrylic acid and hydroxyethyl methacrylate; a copolymer of acrylic acid and methacrylic acid; and a copolymer of ethylene glycol methacrylate phosphate and hydroxyethyl methacrylate.

2. The method of claim 1, wherein the silicate mineral is magnesium silicate.

3. The method of claim 1, wherein the silicate mineral is serpentine.

4. The method of claim 1, wherein the rheological properties comprise the viscosity of the slurry.

5. The method of claim 1, wherein the copolymeric dispersing agent is a copolymer of acrylic acid and 2-acrylamido-2-methyl propane sulfonic acid.

6. The method of claim 5, wherein the copolymer has a molecular weight of 9000-20000 Daltons.

7. The method of claim 5, wherein said copolymer has a molecular weight of 15000-20000 Daltons.

8. The method of claim 5, wherein the ratio of acrylic acid to 2-acrylamido-2-methyl propane sulfonic acid is in the range of 70:30 to 50:50 (w/w).

9. The method of claim 5, wherein the ratio of acrylic acid to 2-acrylamide-2-methyl propane sulfonic acid is about 60:40 (w/w).

10. The method of claim 1, wherein the copolymeric dispersing agent is a copolymer of acrylic acid and hydroxyethyl methacrylate.

11. The method of claim 10, wherein the copolymer has a molecular weight of 6000-14000 Daltons.

12. The method of claim 10, wherein the ratio of acrylic acid to hydroxyethyl methacrylate is in the range of 80:20 to 60:40 (w/w).

13. The method of claim 10, wherein the ratio of acrylic acid to hydroxyethyl methacrylate is about 70:30 (w/w).

14. The method of claim 1, wherein the copolymeric dispersing agent is a copolymer of acrylic acid and methacrylic acid.

15. The method of claim 14, wherein the copolymer has a molecular weight of 4000-7000 Daltons.

16. The method of claim 14, wherein the copolymer has a molecular weight of about 5500 Daltons.

17. The method of claim 1, wherein the copolymeric dispersing agent is a copolymer of ethylene glycol methacrylate phosphate and hydroxyethyl methacrylate.

18. The method of claim 17, wherein the copolymer has a molecular weight of 8000-12000 Daltons.

19. The method of claim 17, wherein the copolymer has a molecular weight of about 10000 Daltons.

\* \* \* \* \*